US008252872B2

(12) United States Patent
Tournilhac et al.

(10) Patent No.: US 8,252,872 B2
(45) Date of Patent: Aug. 28, 2012

(54) POLYMER MATERIAL CONTAINING CHAINS BEARING IMIDAZOLIDONE FUNCTIONS

(75) Inventors: Francois-Genes Tournilhac, Paris (FR); Ludwik Leibler, Paris (FR); Philippe Cordier, Buros (FR); Corinne Soulie-Ziakovic, Paris (FR); Annett Linemann, Sarreguernines (FR); Manuel Hidalgo, Brignais (FR)

(73) Assignees: Arkema France, Colombes (FR); Centre National de la Recherche Scientifique, Paris (FR)

( * ) Notice: Subject to any disclaimer, the term of this patent is extended or adjusted under 35 U.S.C. 154(b) by 5 days.

(21) Appl. No.: 12/878,383

(22) Filed: Sep. 9, 2010

(65) Prior Publication Data
US 2011/0135859 A1 Jun. 9, 2011

Related U.S. Application Data

(62) Division of application No. 11/631,690, filed on May 14, 2007, now abandoned.

(30) Foreign Application Priority Data

Jul. 8, 2004 (FR) ...................................... 04 07608
Jul. 6, 2005 (WO) ................. PCT/FR2005/001741

(51) Int. Cl.
*C08F 8/30* (2006.01)
*C08F 8/32* (2006.01)
*C08G 69/48* (2006.01)
*C08L 77/00* (2006.01)

(52) U.S. Cl. .......... 525/420; 525/50; 525/418; 525/419; 525/432; 525/540

(58) Field of Classification Search .................... 525/50, 525/418, 419, 420, 432, 540
See application file for complete search history.

(56) References Cited

U.S. PATENT DOCUMENTS

| 2,980,652 | A | 4/1961 | Melamed et al. |
| 3,218,258 | A | 11/1965 | Bauer et al. |
| 3,563,957 | A | 2/1971 | Beebe et al. |
| 5,188,745 | A | 2/1993 | Migdal et al. |
| 5,270,399 | A | 12/1993 | Czornij et al. |
| 2005/0148760 | A1 * | 7/2005 | Tournilhac et al. ........... 528/422 |

FOREIGN PATENT DOCUMENTS

| FR | 2684387 | 11/1991 |
| FR | 2684387 | 8/1994 |
| WO | WO-03059964 A2 * | 7/2003 |

* cited by examiner

*Primary Examiner* — Irina S Zemel
*Assistant Examiner* — Jeffrey Lenihan
(74) *Attorney, Agent, or Firm* — RatnerPrestia

(57) ABSTRACT

The invention concerns a polymer material consisting of macromolecular chains bound by hydrogen bonds, wherein: the macromolecular chains consist of a polymer skeleton whereon is fixed by at least one covalent bond a modifying agent, the modifying agent comprising, assembled in a common molecule, one or more associative groups capable of being bound by hydrogen bonds and one or more reactive groups capable of forming covalent bonds with the polymer skeleton, at least one of the associative groups of the modifying agent is an imidazolidone heterocycle, the macromolecular chains bear on average, 1 to 10 imidazolidone groups per chain. The average number of imidazolidone groups to be introduced into the macromolecular chains depends both on the average mass of said chains and the final properties desired for the material.

20 Claims, 4 Drawing Sheets

POLYMER MATERIAL CONTAINING CHAINS BEARING IMIDAZOLIDONE FUNCTIONS

CROSS-REFERENCE TO RELATED APPLICATIONS

This application is a divisional application of U.S. patent application Ser. No. 11/631,690, filed May 14, 2007, now abandoned which is a national stage application under 35 U.S.C. §371 of POT application no. PCT/FR2005/001741 filed Jul. 6, 2005, which claims benefit to French patent application no. 04.07608 filed Jul. 8, 2004, all of which are incorporated herein by reference.

FIELD OF THE INVENTION

The present invention relates to the field of polymer materials, particularly to the field of polymer materials composed of macromolecular chains linked via interactions of hydrogen bond type. It also relates to the processes for the syntheses of these materials and to their uses as additives in compositions.

The materials of the invention can be used as is or, for example, as impact modifiers or rheology-regulating agents.

BACKGROUND OF THE INVENTION

One of the technical problems which the invention attempts to solve is the compromise between the viscosity level which polymers exhibit in the molten state and their mechanical properties. This is because, in the thermoplastics technology, for example, a low viscosity is required during the processing, which can only be obtained with systems of low molecular weight, but, at the same time, a high elongation at break, a good impact strength, a good creep strength and good resistance to solvents are desired for the final material, which, conversely, requires high molecular weights.

Moreover, it is well known that the synthesis of polymers of very high molecular weights is markedly more difficult than that of polymers of low weights.

Another technical problem to be solved is the preparation of polymer compositions having an improved chemical resistance and an improved chemical stability.

Another problem which the invention attempts to solve is the preparation of block or comb sequential copolymers by joining up homopolymers prepared in a first step.

The Applicant company has found that these problems can be solved by the chemical modification of polymers by introducing therein a modifying agent comprising imidazolidone groups.

The chemical modification of polymer systems according to the invention involves the formation of a covalent bond between the polymer backbone and the modifying agent. The modifying agent comprises, combined in the same molecule, one or more associative groups capable of uniting via hydrogen bonds and one or more reactive groups capable of forming covalent bonds with the polymer backbone. According to the invention, at least one of the associative groups of the modifying agent is a heterocycle of imidazolidone type. If appropriate, the polymer backbone under consideration can comprise a certain number of comonomers carefully chosen in order to facilitate the grafting operation, that is to say the attaching of the modifying agent to the polymer backbone via at least one covalent bond.

Due to the presence of the associative groups, the modified polymer chains are capable of uniting via cooperative hydrogen bonds; the role of the associative groups may also be to strengthen this associative ability if the latter preexists in the unmodified system. One advantage of this type of association is that these hydrogen bonds are reversible: they can be cleaved by a rise in temperature or by the action of a selective solvent and can subsequently be reformed.

One advantage of the chemical modifications disclosed in this patent is the improvement in the conditions for processing and the final properties, in particular mechanical properties, of the modified polymers. Likewise, the use of associative groups confers the properties of polymers of high weights on polymers of small molecular weights which are easier to produce in a controlled fashion.

The chemical modifications disclosed in this patent make it possible to graft the same type of associative group to different types of macromolecular chains.

The associative groups can be introduced into the polymers by different routes. Mention may be made of copolymerization with a monomer carrying the associative group or the use, during the synthesis of the polymer, of the modifying agent as transfer agent or terminating agent. According to the invention, the associative groups are introduced onto preformed polymer or copolymer systems by reaction with the modifying agent; in other words, after the polymerization or polycondensation stage. For the polymer systems resulting from polycondensations, such as, for example, polyesters and polyamides, which de facto exhibit reactive chain ends, the modifying agent can also be introduced during the synthesis as chain-limiting agent.

One of the advantages of proceeding by modification of existing polymers or copolymers is to be able to synthesize an entire range of products from a single polymerization; for example, modified polymers comprising a relatively large number of associative groups can be obtained by varying the amount of modifying agent or the reaction time during the grafting stage, whereas, to achieve the same result using monomers carrying the associative group, it is necessary to carry out a fresh polymerization in each case.

Finally, the presence of these associative groups on macromolecular chains belonging to different polymer categories makes it possible to produce block copolymers, the two blocks of which are linked via hydrogen bonds.

SUMMARY OF THE INVENTION

The subject matter of the invention is thus a polymer material composed of macromolecular chains linked via hydrogen bonds, in which:

the macromolecular chains are composed of a polymer backbone to which a modifying agent is attached via at least one covalent bond, the modifying agent comprises, combined in the same molecule, one or more associative groups capable of uniting via hydrogen bonds and one or more reactive groups capable of forming covalent bonds with the polymer backbone, at least one of the associative groups of the modifying agent is a heterocycle of imidazolidone type, the macromolecular chains carry, on average, 1 to 10 imidazolidone groups per chain.

If appropriate, the polymer backbone under consideration can comprise a certain number of comonomers carefully chosen in order to facilitate the grafting operation, that is to say the attaching of the modifying agent to the polymer backbone via at least one covalent bond.

The average number of imidazolidone groups to be introduced into the macromolecular chains depends both on the average weight of these chains and on the final properties which it is desired to confer on the material.

It is possible to use a mixture of modifying agents. For example, different modifying agents can be attached to the same polymer backbone, one modifying agent can be attached to polymer backbones and another modifying agent to the other polymer backbones, the polymer backbones can be mixtures of different polymer backbones or any combination of these possibilities.

The polymer material of the invention can be extruded, coextruded, injection molded, blow molded, molded, overmolded, calendered or thermoformed. Objects, such as, for example, pipes, films, sheets, laces, bottles or containers, can be prepared therefrom. The polymer material of the invention can also be blended with other materials, such as other polymers; thus, it is, for example, used as impact modifier or rheology regulator.

The present invention also relates to the use of the preceding polymer material as compatibilizing agent in a composition comprising, inter alia, at least two polymers belonging to different polymer categories.

DETAILED DESCRIPTION OF THE INVENTION

Figure 1:
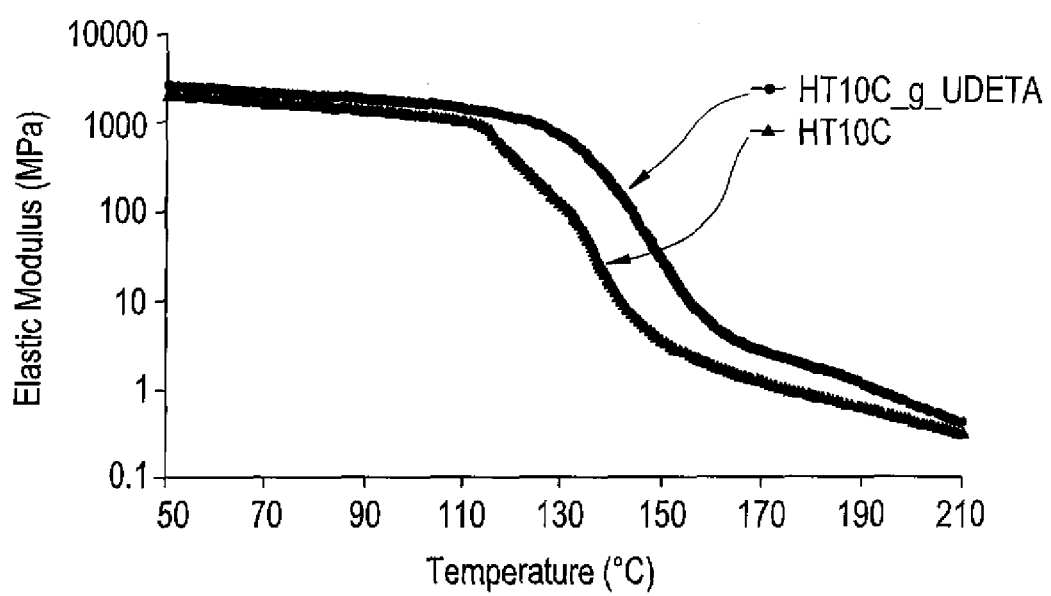
FIG. 1: Dynamic mechanical analysis (DMA) showing elastic modulus versus temperature of a methyl methacrylate-based copolymer (HT10) versus a modified copolymer of HT10 grafted with N-aminoethyl-2-imidazolidone (AEIO).

As regards the polymer backbones, they can belong to different polymer categories. They are preferably chosen from polyolefins, polydienes, polyvinyls, polyacrylates, polymethacrylates, polyesters, polyamides, polyethers, polycarbonates, polysiloxanes, polyurethanes and copolymers of the above types. According to a preferred form, the number-average molar mass of the polymer backbones is between 1000 and 100 000.

As regards the modifying agent, it comprises, combined in the same molecule, one or more associative groups A capable of uniting via hydrogen bonds and one or more reactive groups R capable of forming covalent bonds with the polymer. The groups A and R are connected to one another via a rigid or flexible chain X:

A-X—R

According to the invention, at least one of the associative groups of the modifying agent is a heterocycle of imidazolidone type.

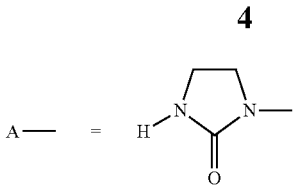

The reactive group(s) present in the modifying agent does/do not have to be a polymerizable chemical group but only a group capable of forming a covalent bond with reactive groups present on the polymer backbone. Preferably, R can be a halogen or a primary or secondary amine, alcohol, thiol, aldehyde, ketone, carboxylic acid or derivative (acid chloride or bromide, acid anhydride or ester), sulfonic acid or derivative, isocyanate or epoxy group.

The rigid or flexible chain X can be a hydrocarbon chain carrying one or more heteroelements; it can be a linear or branched alkyl chain composed of 1 to 30 carbon atoms, a ring or a sequence of alkyl or aryl units linked via —C(O) O—, OC(O), C(O), —O—, —S— or —NH— bridges; advantageously, these groups present on the chain X, in particular when C(O)NH amide bridges are involved, are capable of joining together via hydrogen bonds.

Optionally, the reaction of R with the polymer backbone can bring about the appearance of additional groups which can combine via hydrogen bonding and in particular —C(ON)NH— or —NHC(O)-amide bridges.

According to a preferred form of the invention, the modifying agent corresponds to one of the following molecules:

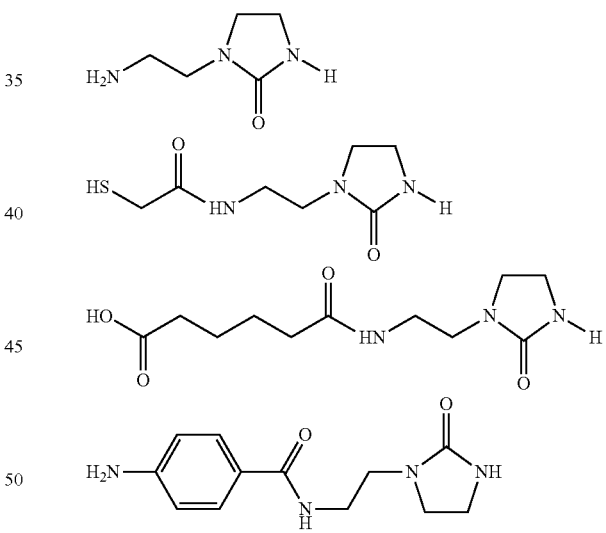

Surprisingly, the chemical modification of polymers by grafting imidazolidone associative groups results in a considerable variation in the physical properties of these polymers. In particular, the presence of the associative groups is reflected by a rise in the elastic modulus of the modified polymers, this being the case within a broad temperature range. Thus, in the case of modified PMMA, an improvement in the elastic modulus is found up to a temperature of approximately 170° C., whereas, in the systems described previously, the improvement in the mechanical properties is substantial only at low temperature (below 80° C. [Yamauchi K. et al., *Macromolecules*, 37, 3519 (2004)] or below 140° C. [Colombani O. Doctoral thesis, Université de Paris VI (2003)] according to the system under consideration). This characteristic makes it possible to envisage the strengthening of systems, such as PMMA, which already have a high thermomechanical strength, while retaining other properties, such as transparency, high-temperature flow or ease of processing. In addition, the polymer systems modified by associative groups of imidazolidone type exhibit an improved resistance to solvents.

The blending of two different polymer backbones carrying imidazolidone functional groups makes it possible to form "block copolymers". These diblocks exhibit a microphase separation.

Diblock-type linear association:

"Multiblock"-type linear association: A and B different polymer backbones

±: group comprising the imidazolidone functional group. Different polymer backbones A and B carry a modifying agent at each of their ends. An A/B multiblock linear association is thus obtained.

"Branched" association of "grafted copolymer" type: A and B two different polymer backbones.

±: group comprising the imidazolidone functional group

A and B different polymer backbones, each chain of A carries at least two modifying agents and B carries a modifying agent at one of its ends or a modifying agent at each of its ends.

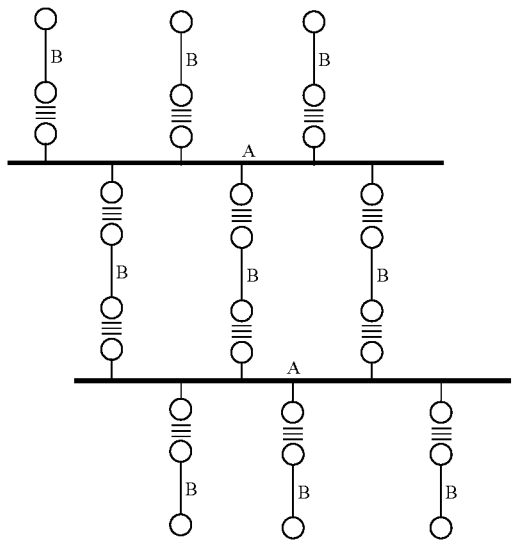

EXAMPLE 1

Synthesis of N-aminoethyl-2-imidazolidone (AEIO)

154.5 g (1.5 mol) of diethylenetriamine (DETA) and 154.5 g (8.58 mol) of water are introduced into a 500 ml three-necked flask equipped with a water-cooled reflux condenser and a magnetic stirrer. Nitrogen sweeps through the reaction mixture.

The evolution of heat brought about by the water/DETA mixing makes it possible to preheat the reaction medium. 45 g (0.75 mol) of urea are then added. The temperature is increased until reflux is obtained (~130° C.). The reaction is carried out for 10 hours.

After reaction, without changing the temperature but removing the reflux system, the water and the DETA are allowed to evaporate as much as possible. The residual DETA is evaporated by simple distillation under a slight vacuum (10 mmHg) at ~75° C.

The mixture is then distilled by fractional distillation under vacuum at ~0.08-0.09 mmHg. The first fraction is not collected. For the second fraction, the column top temperature is then 105° C.

A white crystalline solid, AEIO, is obtained with a melting point M.p. of 41° C. and a molecular weight of 129 g. The yield after distillation is η=75% with respect to the urea.

EXAMPLE 2

Grafting of AEIO to MMA-Based Copolymer 3 g of HT10 copolymer (acrylic copolymer comprising 90% of methyl methacrylate, $M_n$=40 000 g/mol, ~30 anhydride functional groups per chain) and 290 mg (2.25 mmol) of AEIO synthesized according to example 1 are introduced at 220° C. into a Daca twin-screw extruder equipped with recirculation. The blending time is 5 min and gives the grafted copolymer HT10-g-UD.

For each copolymer, 3 bands are recorded by FTIR relating to the C=O double bonds (between 1850 and 1600 $cm^{-1}$):

| HT10 | Functional group | HT10-g-UD | Functional group |
|---|---|---|---|
| 1803 $cm^{-1}$ | Anhydride | 1730 $cm^{-1}$ | Ester |
| 1760 $cm^{-1}$ | Anhydride | 1674 $cm^{-1}$ | Imidazolidone |
| 1732 $cm^{-1}$ | Ester | 1650 $cm^{-1}$ | Amide |

The grafting is testified to by the complete disappearance of the anhydride bands and the appearance of bands characteristic of the imidazolidone unit.

For the modified copolymer, a significant reduction in the solubility in chloroform and an increase in the glass transition temperature are recorded.

Tg(HT10)=121° C. and Tg(HT10-g-UD)=129° C.

By Dynamic Mechanical Analysis (DMA) as shown in FIG. 1, the difference between the Tg values of the two copolymers is also encountered with regard to the softening point. Furthermore, as depicted in FIG. 1, from 190° C., the elastic modulus of HT10-g-UD falls and ends up by being coincident with that of HT10.

EXAMPLE 3

Grafting of AEIO to MMA-Based Copolymer 3 g of HT121 copolymer (acrylic copolymer comprising 96% of methyl methacrylate, $M_n$=40 000 g/mol, ~3 anhydride functional groups per chain) and 29 mg (0.225 mmol) of AEIO synthesized according to example 1 are introduced at 220° C. into a Daca twin-screw extruder equipped with recirculation. The blending time is 5 min and gives the grafted copolymer HT121-g-UD.

For each copolymer, 3 bands are recorded by FTIR relating to the C=O double bonds (between 1850 and 1600 cm$^{-1}$):

| HT121 | Functional group | HT121-g-UD | Functional group |
|---|---|---|---|
| 1803 cm$^{-1}$ | Anhydride | 1730 cm$^{-1}$ | Ester |
| 1760 cm$^{-1}$ | Anhydride | 1674 cm$^{-1}$ | Imidazolidone |
| 1732 cm$^{-1}$ | Ester | 1650 cm$^{-1}$ | Amide |

The grafting is testified to by the complete disappearance of the anhydride bands and the appearance of bands characteristic of the imidazolidone unit.

For the copolymer, an increase in the glass transition temperature is recorded.

Tg(HT121)=123° C. and Tg(HT121-g-UD)=129° C.

EXAMPLE 4

Grafting of AEIO to Ethylene-Based Copolymer 3 g of Lotader 3210 copolymer ($M_n$=13 500 g/mol, ~2.8 anhydride groups per chain), comprising 0.21 mmol of anhydride functional groups, and 27 mg (0.21 mmol) of AEIO synthesized according to Example 1 are introduced at 140° C. into a Daca twin-screw extruder equipped with recirculation. The blending time is 10 min and gives the grafted copolymer Lotader 3210-g-UD.

Three bands relating to the C=O double bonds (between 1850 and 1600 cm$^{-1}$) are recorded by FTIR for each copolymer:

| Lotader 3210 | Functional group | Lotader 3210-g-UD | Functional group |
|---|---|---|---|
| 1854 cm$^{-1}$ | Anhydride | 1843 cm$^{-1}$ | Anhydride |
| 1780 cm$^{-1}$ | Anhydride | 1777 cm$^{-1}$ | Anhydride |
| 1735 cm$^{-1}$ | Ester | 1734 cm$^{-1}$ | Ester |
| 1710 cm$^{-1}$ | Acid | 1709 cm$^{-1}$ | Acid |
| | | 1680 cm$^{-1}$ | Imidazolidone |
| | | 1650 cm$^{-1}$ | Amide |

The infrared spectrum of Lotader 3210 shows that a high proportion of the maleic anhydride groups are hydrolyzed and will not participate in the grafting. In Lotader 3210-g-UD, a fall in the intensity of the anhydride peaks is observed to the advantage of the acid peak and of the new amide and imidazolidone peaks. However, the grafting is not 100%.

The melting point of the copolymers is identical (105° C.), as is the degree of crystallinity (28%).

By DMA, after melting, the elastic modulus of the Lotader 3210-g-UD copolymer exhibits a secondary plateau at approximately 0.15 MPa, whereas the Lotader 3210 copolymer does not have it.

EXAMPLE 5

Grafting of AEIO to Polyamide

Figure 2A:
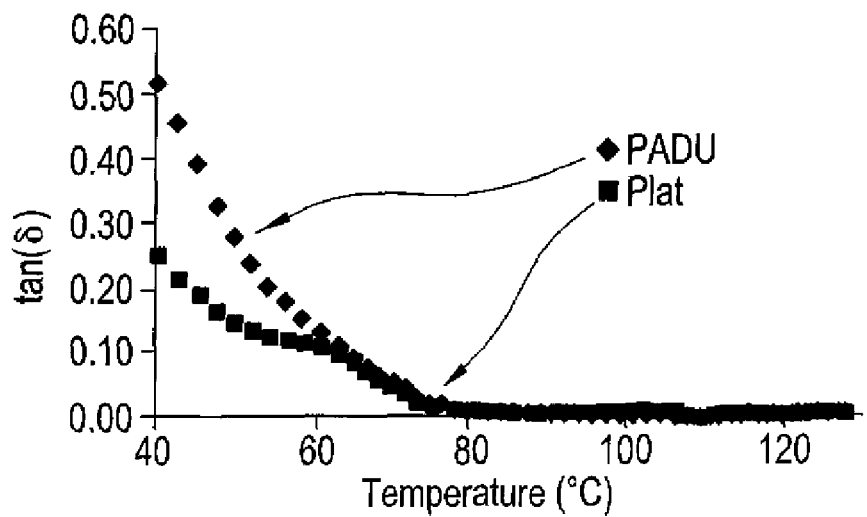
FIGS. 2A and 2B: Depict tan(δ) and Modulus (Pa) versus temperature of a polyamide polymer (Plat) and a modified polyamide polymer (PADU) made according to Example 5.
Figure 2B:
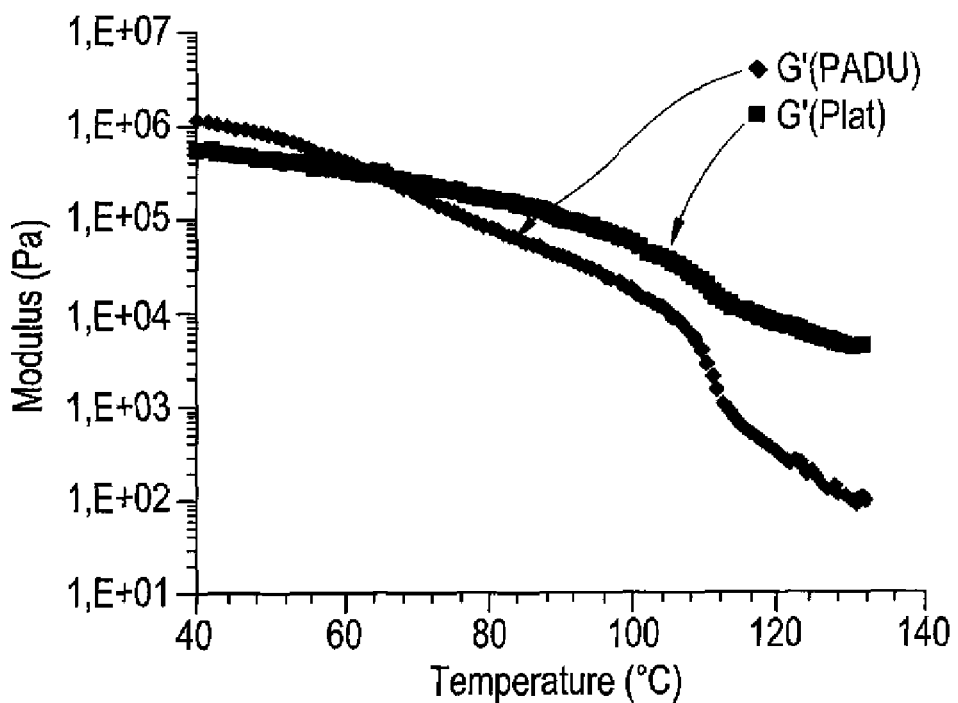

AEIO is grafted under similar conditions to a polyamide of low molecular weight $M_w$=1500 g/mol comprising COOH endings. In comparison with a polyamide of the same family of molecular weight $M_w$=15 000 g/mol (Platamid), the modified polyamide, PADU, as shown in FIGS. 2A and 2B, exhibits an increase in the elastic modulus at ambient temperature and up to a temperature of approximately 65° C. and a greater flow at high temperature.

EXAMPLE 6

Grafting of AEIO to PMMA with 5% of Acid Functional Groups

A copolymer of methyl methacrylate and of methacrylic acid (4.5% by number) HT121 ($M_n$=40 000 g/mol) is extruded in a DSM twin-screw miniextruder with recirculation at 220° C. for 30 min. The appearance of two absorption bands by FTIR (in solution in chloroform) characteristic of the C—O bonds of anhydrides is observed at 1755 and 1805 cm$^{-1}$.

15 g of this product are subsequently blended in the same extruder with 1 g of AEIO at 220° C. for 5 min. The FTIR study (CHCl$_3$) of the product obtained shows partial grafting: the band of the C=O bond of the amide formed appears at approximately 1670 cm$^{-1}$ but the bands corresponding to the C=O bonds of the anhydride only decrease very slightly.

The HT121 and grafted HT121 samples are prepared by compressing in the form of disks. These disks are placed in an Ares parallel plate rheometer at 175° C. and a frequency sweep test is carried out (from 10 Hz to 0.32 MHz) with a constant strain of 1%.

| | HT121 | Grafted HT121 |
|---|---|---|
| Complex viscosity at 10 Hz (Pa · s) | 7267 | 7329 |
| Complex viscosity at 0.00032 Hz (Pa · s) | 2.5E+06 | 1.7E+07 |
| Frequency where G' = G" (Hz) | 0.0257 | <0.00032 |
| Relaxation time (s) | 6.2 | >500 |

The viscosity at the frequencies above 0.2 Hz is the same for both samples. On the other hand, the viscosity at low frequencies is significantly enhanced by the grafting. A very marked increase in the relaxation time of the chains is also observed for the grafted HT121; this time is too long to be measurable in the frequency sweep mode used.

Figure 3:
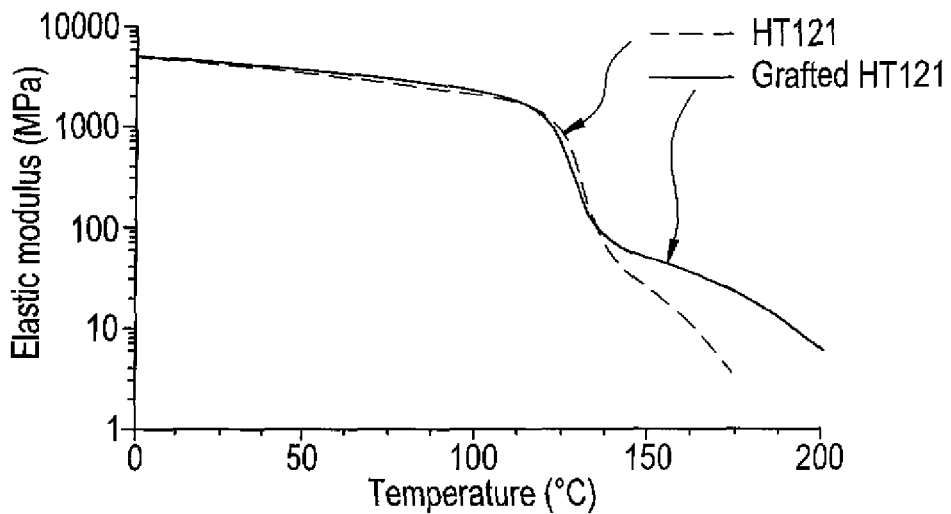
FIG. 3: Dynamic mechanical analysis showing elastic modulus versus temperature of a methyl methacrylate/methacrylic acid copolymer (HT121) versus a modified copolymer of HT121 grafted with AEIO.

FIG. 3 shows dynamic mechanical tests (DMA) carried out on HT121 and grafted HT121 at 1 Hz with heating at 2° C./min. As shown in FIG. 3, above the glass transition temperature, a slower decrease in the elastic modulus is observed for grafted HT121 (E' of the order of 50 MPa at 150° C.)

EXAMPLE 7

Grafting of AEIO to PMMA with Anhydride Functional Groups

A copolymer of methyl methacrylate and of methacrylic acid (7.5% by number) ($M_n$=30 000 g/mol) comprising 3.3% of anhydride functional groups is chosen. It is recorded as 72565. 15 g of this polymer are blended with 0.64 g of AEIO in a DSM twin-screw miniextruder equipped with recirculation for 5 minutes at 220° C.

FTIR spectroscopy (CHCl$_3$) reveals the decrease in the bands characteristic of the anhydrides at 1755 and 1805 cm$^{-1}$ and the appearance of the band at approximately 1670 cm$^{-1}$ attributed to the amide formed during the grafting.

An increase in the glass transition temperature Tg due to the grafting is observed:

Tg(72565)=130.8° C. Tg(grafted 72565)=133.7° C.

Figure 4:
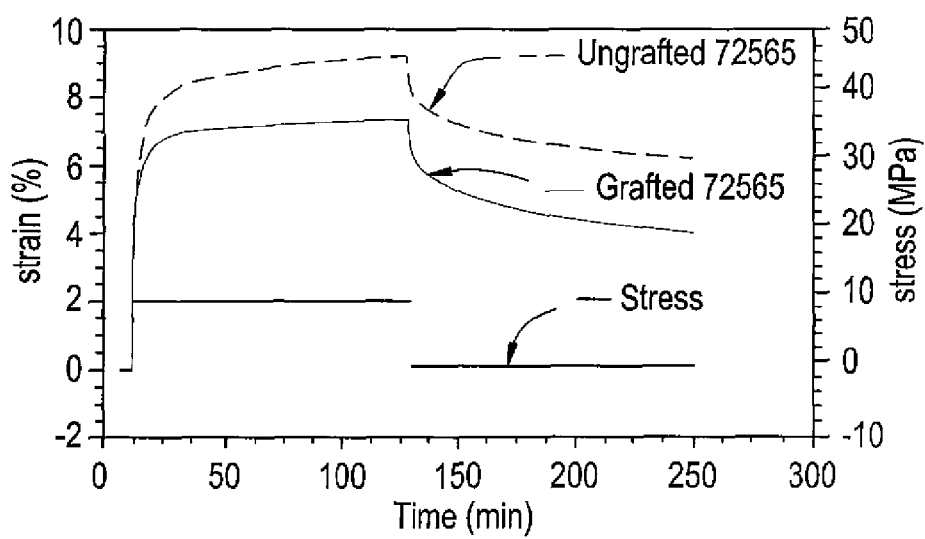
FIG. 4: Dynamic mechanical analysis bending creep test showing strain and stress versus time for a methyl methacrylate copolymer (72565) versus a modified copolymer of 72565 grafted with AEIO according to Example 7.

FIG. 4 shows the results of a DMA bending creep test that is carried out for 72565 and grafted 72565; for each compound, the test temperature is lower than the Tg by 10° C. A stress of 10 MPa is applied for 2 hours and then the recovery is observed over a period of 2 hours. FIG. 4 represents the strain and constant stress profiles measured as a function of the time. 72565 has a strain level of 9.2% after 2 hours, in comparison to 7.2% for grafted 72565. The grafting also significantly improves the recovery; after recovering for 2 hours, grafted 72565 has a residual strain of 3.8% (i.e., virtually half of the strain brought about by the creep), in comparison with 6.0% for 72565, which thus recovered only a third of the strain introduced by the creep.

Frequency sweeps are carried out at 175° C. in a rheometer with parallel plate geometry. The viscosity at high frequencies is not significantly modified but it increases quite sizably at low frequencies.

|  | 72565 | Grafted 72565 |
|---|---|---|
| Complex viscosity at 10 Hz (Pa · s) | 1.0E+04 | 1.6E+04 |
| Complex viscosity at 0.00046 Hz (Pa · s) | 2.4E+06 | 8.4E+06 |
| Frequency where G' = G'' (Hz) | 0.03 | 0.0033 |
| Relaxation time (s) | 5.3 | 48.2 |

EXAMPLE 8

Grafting in Solution of AEIO to PMMA with Anhydride Functional Groups 40 g of PMMA 72565, 3.5 g of AEIO (in excess) and 600 ml of anhydrous chloroform are introduced into a one-liter round-bottomed flask equipped with a reflux heating system. FTIR (CHCl$_3$) reveals the disappearance of the bands at 1755 and 1805 cm$^{-1}$ attributed to the anhydrides and the appearance of an amide band at 1670 cm$^{-1}$.

The DSC study also shows a significant rise in the Tg: Tg (72565)=130.8° C. Tg (grafted 72565_solution)=138.3° C.

EXAMPLE 8a

Figure 5:
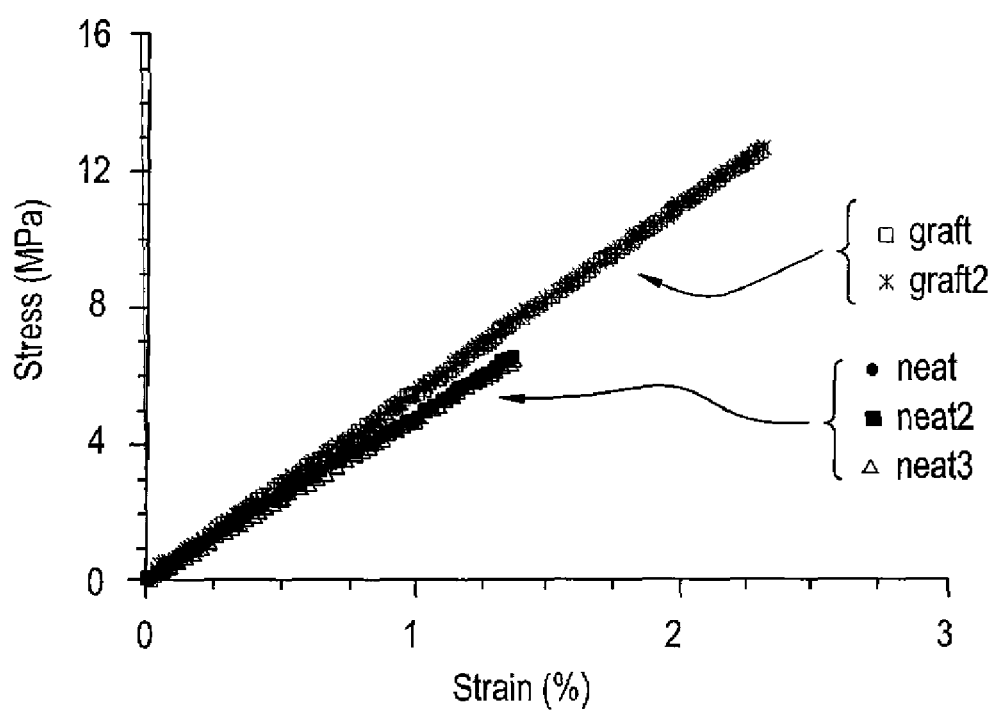
FIG. 5: Depicts stress versus strain of a methyl methacrylate copolymer (PMMA-3) neat in comparison to a modified copolymer of PMMA-3 grafted with AEIO.

Extrusion Grafting of AEIO to a PMMA of M$_n$=10 000 g/mol with Anhydride Functional Groups 10 g of PMMA-3 (with a number-average weight equal to 10 000 g/mol comprising 8 mol % of anhydride functional groups) are extruded at 220° C. in a DSM twin-screw extruder, in the absence or in the presence of one equivalent of AEIO. The extruded polymer is injection molded in the form of bars with a cross section of 1.5×4 mm. Thermomechanical analysis (discussed in more detail below) reveals differences between the samples of modified polymer (graft, graft2) and the unmodified samples (neat, neat2, neat3). Thus, the glass transition temperature Tg is 120° C. and 136° C. respectively in the unmodified and modified polymer samples. FIG. 5 depicts stress/strain curves in three point bending of the samples of modified polymer of PMMA-3 (graft, graft2) and the unmodified samples of PMMA-3 (neat, neat2, neat3) at 4 N/min. In three point bending (with a distance of 10.2 mm between points), a rise of +15% in the modulus and of +80% in the strain at break are observed at 30° C. in the modified samples.

Furthermore, an improvement in the creep strength is observed: for this experiment, bars with a length of 18 mm and with a cross section of 1.5×4 mm are subjected to a stress of 1 MPa in single cantilever geometry; the temperature is set at 10° C. above Tg. Thus, at 126° C. in the modified sample, the rate of strain after 2 hours is 0.16% per hour, whereas, under the same conditions and at a temperature of 110° C., it is 0.35% per hour in the sample of unmodified polymer. After removing the stress and while maintaining the temperature for a further 3 hours, the strain decreases down to 29% of its initial value in the sample of modified polymer, whereas it remains at 60% of its initial value in the sample of unmodified polymer.

EXAMPLE 9

Grafting of AEIO to a Polyamide 3 g of a polyamide PA (Platamid) of low weight (M$_n$=3000 g/mol), terminated by acid groups, are introduced, with 0.256 g of AEIO and a drop of orthophosphoric acid, into a Daca twin-screw miniextruder with recirculation. The blend is stirred at 230° C. for 2 minutes, 20 minutes and 1 hour.

An FTIR analysis shows that the band corresponding to the C=O double bonds of carboxylic acid at approximately 1710 cm$^{-1}$ decreases with time.

| Grafting time | Level of the band at 1710 cm$^{-1}$ |
|---|---|
| 0' | 0.06 |
| 2' | 0.032 |
| 20' | 0.026 |
| 60' | 0.023 |

Analyses using an Ares parallel plate rheometer at 150° C., under a constant strain of 1%, show an increase in the viscous modulus over the entire frequency range (from 10 Hz to 0.32 MHz) as a function of the grafting time (the elastic moduli are too low to be measured with accuracy).

|  | PA | PA + UDETA | PA + UDETA | PA + UDETA |
|---|---|---|---|---|
| Grafting time | 0' | 2' | 20' | 60' |
| G'' at 15 Hz (Pa) | 1104 | 641 | 1140 | 1676 |

For reaction times of greater than 20 minutes, an increase in the viscous modulus is observed for the PA+AEIO blends in comparison with the pure ungrafted PA.

What is claimed is:
1. A polymer material composed of macromolecular chains linked via reversible hydrogen bonds, in which:
   the macromolecular chains are composed of a polymer backbone to which one or more modifying agents are attached via at least one covalent bond, wherein said polymer backbone is a polyamide,
   each modifying agent comprises, combined in the same molecule, one or more associative groups capable of uniting via hydrogen bonds and one or more reactive groups capable of forming covalent bonds with the polymer backbone,
   at least one of the associative groups of each modifying agent is a heterocycle of innidazolidone type,
   the macromolecular chains carry, on average, 1 to 10 imidazolidone groups per chain, wherein the modifying agents have the general formula:

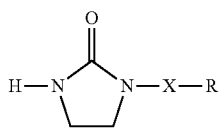

in which:

R denotes a halogen or a primary or secondary amine, alcohol, thiol, aldehyde, ketone, carboxylic acid or derivative, sulfonic acid or derivative, isocyanate or epoxy group, X denotes a rigid or flexible chain selected from the group consisting of a hydrocarbon chain containing one or more heteroelements, a linear or branched alkyl chain composed of 1 to 30 carbon atoms, and a ring or a sequence of alkyl or aryl units linked via —C(O)O—, OC(O), —C(O)NH—, —NHC(O)—, C(O), —O—, —S— or —NH— bridges, wherein the material comprises at least two different polymer backbones, each carrying one or more modifying agents.

2. The polymer material as claimed in claim 1, in which the attaching of the one or more modifying agents brings about the appearance of a bonding group of —NHC(O)— or —C(O)NH— amide type.

3. The polymer material as claimed in claim 1, in which the one or more modifying agents comprise:

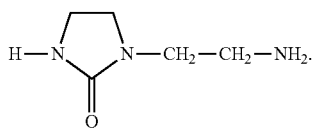

4. The polymer material as claimed in claim 1, in which the one or more modifying agents comprise:

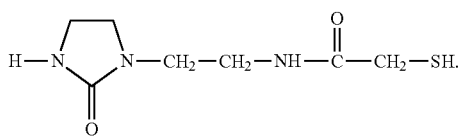

5. The polymer material as claimed in claim 1, in which the one or more modifying agents comprise:

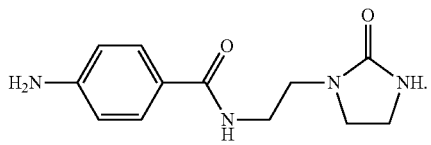

6. The polymer material as claimed in claim 1, in which the one or more modifying agents comprise:

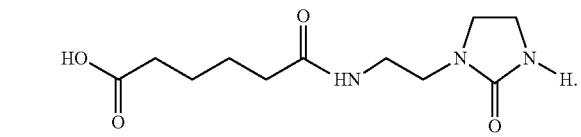

7. The polymer material as claimed in claim 1, in which the polymer backbones exhibit a number-average weight of between 1000 and 100,000.

8. The polymer material as claimed in claim 1, in which there are polymer backbones of two different types A and B carrying a modifying agent at each of their ends forming an A/B multiblock linear association.

9. The polymer material as claimed in claim 1, in which there are polymer backbones of two different types A and B, each chain of A carries at least two modifying agents and B carries a modifying agent at one of its ends or a modifying agent at each of its ends.

10. The polymer material as claimed in claim 1 comprising an impact modifier, rheology regulator, or compatibilizing agent.

11. An object, comprising the polymer material of claim 1.

12. The object of claim 11, wherein said object is selected from the group consisting of a pipe, film, sheet, lace, bottle, and a container.

13. The polymer material as claimed in claim 1, wherein the carboxylic acid derivative is selected from the group consisting of acid chloride, acid bromide, acid anhydride, and acid ester.

14. A polymer material composed of macromolecular chains linked via reversible hydrogen bonds, in which:

the macromolecular chains are composed of a polymer backbone to which one or more modifying agents are attached via at least one covalent bond, wherein said polymer backbone is a polyamide, each modifying agent comprises, combined in the same molecule, one or more associative groups capable of uniting via hydrogen bonds and one or more reactive groups capable of forming covalent bonds with the polymer backbone, at least one of the associative groups of each modifying agent is a heterocycle of imidazolidone type, the macromolecular chains carry, on average, 1 to 10 imidazolidone groups per chain, wherein at least one of the one or more modifying agents is selected from the group consisting of:

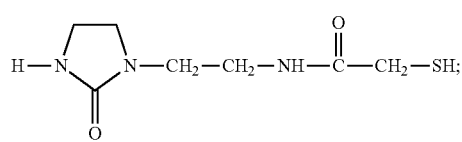

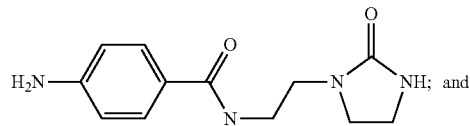

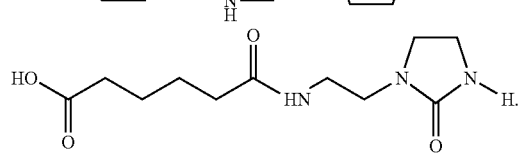

15. The polymer material as claimed in claim 14, wherein the material comprises at least two different polymer backbones, each carrying one or more modifying agents.

16. The polymer material as claimed in claim 15, in which there are polymer backbones of two different types A and B carrying a modifying agent at each of their ends forming an A/B multiblock linear association.

17. The polymer material as claimed in claim 15, in which there are polymer backbones of two different types A and B, each chain of A carries at least two modifying agents and B carries a modifying agent at one of its ends or a modifying agent at each of its ends.

18. The polymer material as claimed in claim 14 comprising an impact modifier, rheology regulator, or compatibilizing agent.

19. An object, comprising the polymer material of claim 14.

20. The object of claim 19, wherein said object is selected from the group consisting of a pipe, film, sheet, lace, bottle, and a container.

* * * * *

UNITED STATES PATENT AND TRADEMARK OFFICE
CERTIFICATE OF CORRECTION

PATENT NO.         : 8,252,872 B2
APPLICATION NO.    : 12/878383
DATED              : August 28, 2012
INVENTOR(S)        : Francois-Genes Tournilhac et al.

Page 1 of 1

It is certified that error appears in the above-identified patent and that said Letters Patent is hereby corrected as shown below:

At column 10, line 64, -- innidazolidone -- should read -- imidazolidone --.

Signed and Sealed this
Twenty-second Day of January, 2013

David J. Kappos
*Director of the United States Patent and Trademark Office*